May 22, 1934.  S. H. COLLOM  1,960,139
FLEXIBLE CONDUIT
Filed Aug. 31, 1933   3 Sheets-Sheet 1

Inventor:—
Samuel H. Collom
by his Attorneys
Howson & Howson

May 22, 1934.  S. H. COLLOM  1,960,139

FLEXIBLE CONDUIT

Filed Aug. 31, 1933  3 Sheets-Sheet 2

Inventor:—
Samuel H. Collom
by his Attorneys
Howson & Howson

May 22, 1934.　　　　S. H. COLLOM　　　　1,960,139
FLEXIBLE CONDUIT
Filed Aug. 31, 1933　　　3 Sheets-Sheet 3

Inventor:—
Samuel H. Collom
by his Attorneys
Howson & Howson

Patented May 22, 1934

1,960,139

UNITED STATES PATENT OFFICE 1,960,139

FLEXIBLE CONDUIT

Samuel H. Collom, Philadelphia, Pa., assignor to Pennsylvania Flexible Metallic Tubing Company, Philadelphia, Pa., a corporation of Pennsylvania Application August 31, 1933, Serial No. 687,691

1 Claim. (Cl. 137—90)

This invention relates to new and useful improvements in flexible hose, tubing or the like, and has particular relation to flexible metallic conduits for conveying fluids under sigh pressures such as steam, liquids and the like.

The principal object of the invention is to provide a flexible metallic conduit of the character set forth having great tensile strength and is capable of withstanding the highest range of pressures.

Another object of the invention is to provide a flexible metallic conduit of the character set forth which, while capable of withstanding great pressures and embodying great tensile strength, is characterized by its comparatively great degree of flexibility.

Another object of the invention is to provide a flexibile conduit of the stated character having a metallic lining formed by a succession of continuous helical windings of metal interlocked with the preceding spiral in a novel sealed joint permitting relative sliding movement between said spirals, and provided with outer reinforcing means formed by a number of continuous helical windings of metal wire, each successive turns of which are contiguous to the next preceding turn.

A more specific object of the invention is to provide a flexible conduit of the stated character having a lining and reinforcing structure as described wherein the cross section shape of the elements comprised in the latter is such as to provide a smooth external surface for the conduit and render the same as flexible as possible.

Other features and details of the invention are set forth hereinafter and disclosed in the accompanying drawings, in which.

Figure 1:
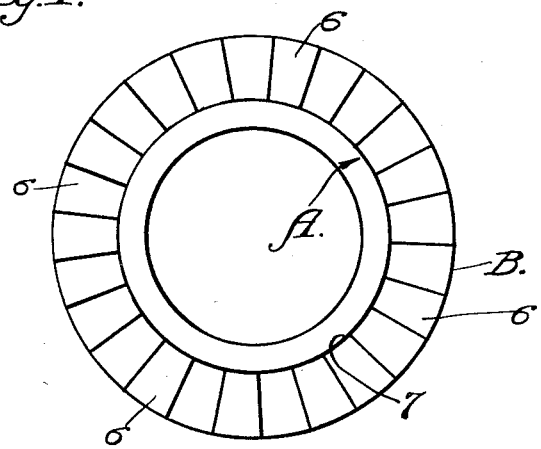
Fig. 1 is a view in plan of the conduit forming the subject of the present invention.

For the most part supposedly flexible metallic conduits intended for use under relatively great pressures have been so constructed for great strength that they are hardly flexible to any degree whatever and their flexibility has been sacrificed in order to provide sufficient strength to withstand really great pressures. However, it is very desirable that conduits of this type be as flexible as possible in order to facilitate handling thereof in use. Up to the present time the trade has been wholly lacking in actually flexible conduits capable of withstanding great pressures.

By this invention a conduit is provided which is both capable of withstanding maximum pressures and flexible to a maximum degree without sacrificing any of its inherent structural strength.

The present invention while it might be equally applicable to conduits of larger inside diameter is particularly adaptable to the smaller size conduits having inside diameters smaller than one inch, which are used particularly for the conveyance of fluids under relatively great pressures.

Referring now more particularly to the drawings, the flexible conduit forming the subject of this invention comprises a flexible metallic lining A which is formed by a continuous helical winding of a metal strip or ribbon 1 having a substantially S-shaped cross-section form, the vertical webs 2 thereof being offset from each other and in substantially parallel planes connected by a transverse portion 3. The top edge of the upper vertical web 2 is bent over outwardly with respect to the disclosure in Fig. 2 as at 4 and a space 5 is provided intermediate the bent over portion 4 and the adjacent vertical web 2. The bottom end of the lower vertical web 2 is similarly formed as at 4a, the said bottom edge being turned inwardly of the web 2 with respect to Fig. 2 in a manner similar to that described in connection with the outwardly turned upper edge 4, a space 5a being provided intermediate the portion 4a and the adjacent web 2.

In winding the successive helical turns of the S-shaped strip 1, the lower or inwardly turned portion 4a is positioned in the space 5 of the preceding turn, the portion 4 of the latter entering the space 5a of the succeeding turn to interlock the portions 4 and 4a providing a substantially strong joint consisting of four thicknesses of metal of the strip and which is so constructed as to permit a sliding action intermediate the interlocking portions 4 and 4a so that a substantially wide range or degree of flexing is available without damage or strain of the metal.

The conduit thus formed solely of the interlocked helical winding is constructed so as to be tightly sealed at the successive jointures of the turns against leakage which would result in a drop in pressure, and while this lining may of itself be successfully employed as a conduit for fluids under medium or less pressures, the same is not inherently strong enough to withstand excessively high pressures. Accordingly it became immediately necessary to devise means for strengthening or reinforcing this conduit to an extent making it available for really great pressures. Numerous and ingenious methods were developed by hydraulic engineers by which the pressure capacity of the conduit might be increased almost without limit but all of the methods directed to this end rendered the conduit so more or less rigid that it practically lost its flexible characteristic. For many years the trade was lacking in a really flexible conduit which would withstand unusually high pressures, and this lack continued until the conduit constituting this invention was developed.

In accordance with this invention a cover member B composed of a number of strands of relatively heavy flexible wire 6 are spirally wound about the exterior of the flexible lining A, each of said wires being wound in a spiral of relatively greater pitch than the pitch of the spirals in the lining. In order that the outer spiral may be as effective as possible each successive turn of each of the wires is in contact, or contiguity, with the next preceding turn of wire as shown in the drawings in order that the surface support on the lining A may be as great as possible. The increase in the angle of pitch of the wires 6 with respect to the turns of the lining give the completed conduit a maximum flexibility and does not detract from pressure capacity thereof.

Figure 2:
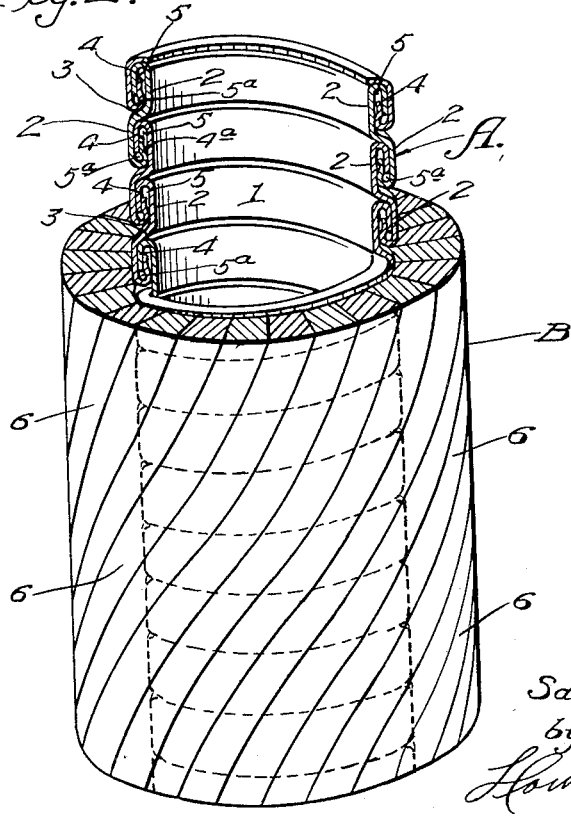
Fig. 2 is a view in perspective of a section of the conduit having a portion thereof cut away to better show its structure.

In conduits of this character it is desirable that the same have a substantially smooth surface and to accomplish this result the surface or outer windings on the lining A are composed of relatively flexible wires 6 having a cross-section shape corresponding to a small segment of an annular disk, the shorter radius of which is equal to the outside radius of the flexible lining A, as shown in Figs. 1 and 2 of the drawings at 7.

Figure 3:
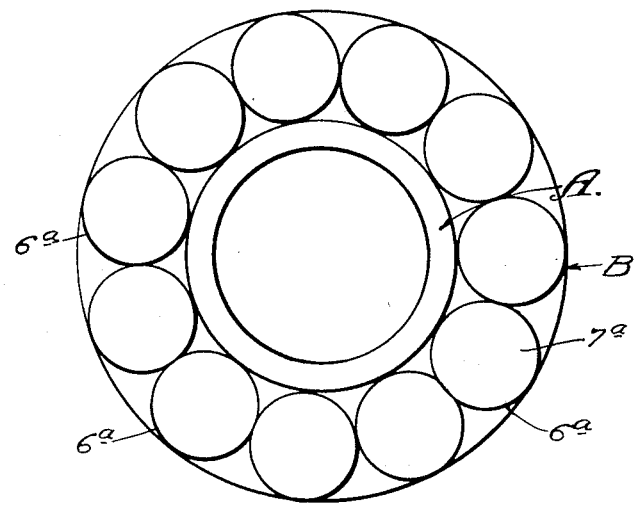
Fig. 3 is a view in plan similar to Fig. 1 showing a modified form of the conduit.
Figure 4:
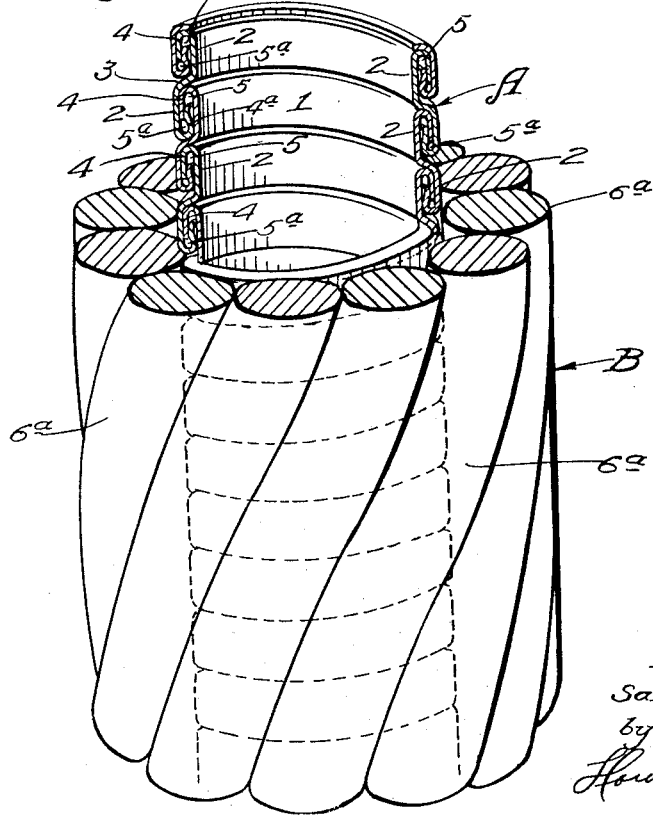
Fig. 4 is a view similar to Fig. 2 of the modification shown in Fig. 3.

A modification of the invention is disclosed in Figs. 3 and 4 of the drawings, wherein the external windings are of flexible wire 6a of substantially circular cross-section shape as at 7a, each turn of wire being in contact or contiguous with the adjacent turns of wire.

Figure 5:
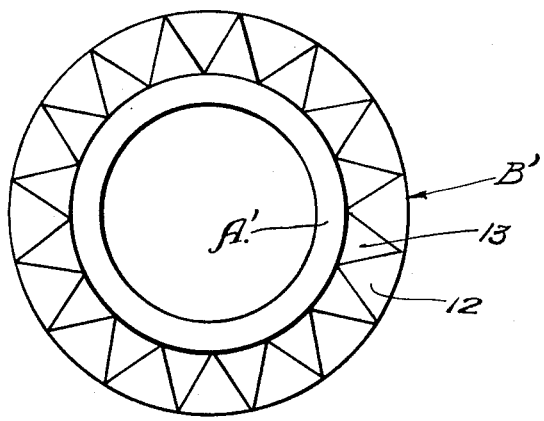
Fig. 5 is a view in plan similar to Fig. 1 showing a modification of the invention.
Figure 6:
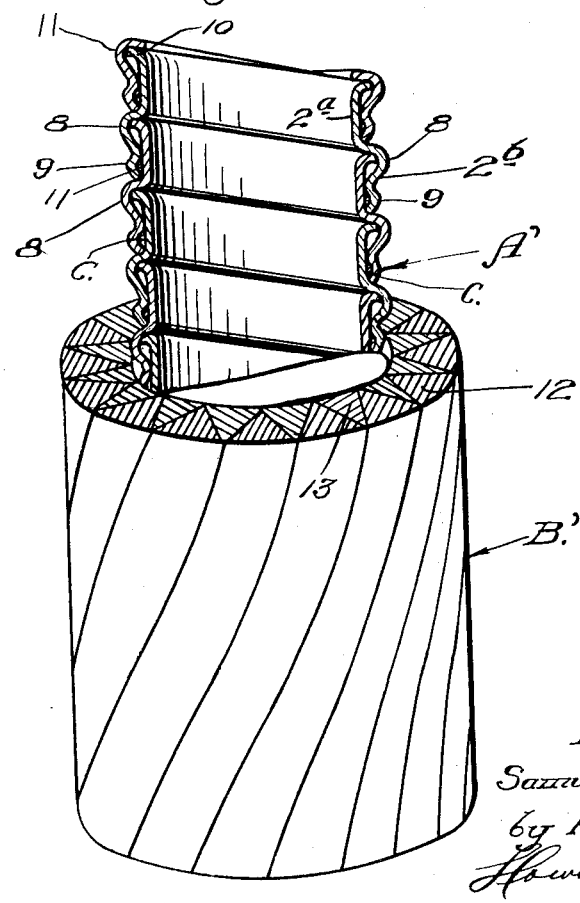
Fig. 6 is a view similar to Fig. 2 of the modification shown in Fig. 5.

A still further modification of the invention is shown in Figs. 5 and 6 of the drawings, and in this particular form a flexible lining A' of different construction than that previously described is used. In the completely wound lining A' each turn of the metal strip comprises inner and outer wall portions 2a and 2b respectively, the lower or outer wall portions 2b of each turn being of irregular surface including relatively large and smaller circumferential ridges 8 and 9 respectively. The upper edge of the inner wall portion 2a of the strip is turned outwardly as at 10 and engages the recess formed by the larger ridge 8 as shown in the drawings. A filler 11 is inserted in the space C between the smaller ridge 9 of outer portion 2b of a strip and the upper inner portion 2a of the next preceding turn of said strip.

The larger ridge which is a completed lining is helical in form, affords a line contact for the reinforcing wires disposed about said lining and functions in the manner of a knife edge bearing to permit relatively friction-free flexing of the complete conduit.

The wires of the reinforcing structure B' are triangular in cross-section shape. In the present instance, two different sizes of wire are used and these are designated as 12 and 13 respectively, the former being larger and disposed so that the bases of the successive turns form the external surface of the conduit, said surface being continuously smooth. The triangular spaces intermediate the surface wires 12 are filled with the smaller wire 13 which is fed simultaneously with the larger wire so that successively alternate turns of each will result in the manner shown in Fig. 6 of the drawings.

Of course, it will be obvious that any one of the outer reinforcing structures may be used with either of the flexible linings A and A' shown or any other lining that may be found suitable for such use.

A conduit of the character described herein is also readily adaptable for high tension electric power line installations such as extending numerous instances for many miles cross country. In such installations great tensile strength is desirable and flexibility not inadvisable under certain climatic conditions. Furthermore the tubular form of the conduit renders itself particularly adaptable to the conduction of electric currents which are well known to travel more readily along a tubular wire than one that is of solid cross-section shape. The conduit may be adapted to any electrical installation where flexibility is desired.

While the conduit has been set forth in detail for descriptive purposes it is not intended that the invention be limited thereto within the scope of the annexed claim.

What is claimed is:

A flexible high pressure conduit comprising an inner flexible metallic tube having a continuous helical ridge on the outer surface thereof, and an outer member composed of continuous contiguous helical windings each having the cross-section shape of a segment of an annulus the inner radius of which is equal to the outside radius of the tube, said windings being disposed at a greater pitch than the pitch of the helical ridge of said tube which constitutes a bearing contact for the outer member to facilitate flexing of the conduit.

SAMUEL H. COLLOM.